United States Patent
Higuchi et al.

(10) Patent No.: US 11,835,355 B2
(45) Date of Patent: Dec. 5, 2023

(54) PARKING SPOT ROUTE OPTIMIZATION SYSTEMS AND METHODS FOR OPTIMIZING PARKING SPOT DATABASES

(71) Applicant: Toyota Motor Engineering & Manufacturing North America, Inc., Plano, TX (US)

(72) Inventors: Takamasa Higuchi, Mountain View, CA (US); Kentaro Oguchi, Mountain View, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 513 days.

(21) Appl. No.: 17/165,197

(22) Filed: Feb. 2, 2021

(65) Prior Publication Data

US 2022/0136855 A1 May 5, 2022

Related U.S. Application Data (60) Provisional application No. 63/106,973, filed on Oct. 29, 2020.

(51) Int. Cl.
*G01C 21/36* (2006.01)
*G08G 1/14* (2006.01)

(52) U.S. Cl.
CPC ......... *G01C 21/3685* (2013.01); *G08G 1/146* (2013.01); *G08G 1/148* (2013.01)

(58) Field of Classification Search
CPC .............................................. G01C 21/3685
See application file for complete search history.

(56) References Cited

U.S. PATENT DOCUMENTS

| 6,411,895 | B1 | 6/2002 | Lau et al. |
| 8,742,948 | B2 | 6/2014 | Ren |
| 10,529,233 | B1 | 1/2020 | Vieten et al. |
| 2012/0286968 | A1* | 11/2012 | Jones ............... G06Q 30/0284 340/870.02 |
| 2016/0061618 | A1* | 3/2016 | Benenson .......... G01C 21/3453 701/428 |
| 2016/0117925 | A1 | 4/2016 | Akavaram et al. |

(Continued)

FOREIGN PATENT DOCUMENTS

| CN | 109509367 A | 3/2019 |
| CN | 110246360 A | 9/2019 |

(Continued)

OTHER PUBLICATIONS

Takamasa Higuchi and Kentaro Oguchi, Parking availability by noisy sensor measurements of connected vehicles, U.S. Appl. No. 63/009,903, filed Apr. 2020.

(Continued)

*Primary Examiner* — Shelley Chen
(74) *Attorney, Agent, or Firm* — Dinsmore & Shohl LLP (57) ABSTRACT

A method for optimizing a parking spot database is provided including determining a utility score of a candidate route to a candidate parking spot of a plurality of parking spots of a parking spot database based on an availability status of a non-candidate parking spot along the candidate route, and selecting the candidate route from a plurality of candidate routes based on the utility score.

19 Claims, 6 Drawing Sheets

(56) References Cited

U.S. PATENT DOCUMENTS

2019/0375590 A1  12/2019  Gravelle et al.
2020/0011671 A1   1/2020  Puri et al.

FOREIGN PATENT DOCUMENTS

| CN | 106469518 B      |   | 10/2019 |         |            |
|----|------------------|---|---------|---------|------------|
| DE | 102015216266 A1  | * | 3/2016  | ……… | G01C 21/3453 |
| JP | 2019091279 A     | * | 6/2019  | ……… | B60R 21/0134 |
| RU | 2702927 C1       | * | 10/2019 | ……… | B60R 21/0134 |

OTHER PUBLICATIONS

Takamasa Higuchi and Kentaro Oguchi, Hierarchical Parking Assistance by Connected Vehicles, U.S. Appl. No. 16/778,816, filed Jan. 13, 2020.

* cited by examiner

PARKING SPOT ROUTE OPTIMIZATION SYSTEMS AND METHODS FOR OPTIMIZING PARKING SPOT DATABASES

CROSS-REFERENCE TO RELATED APPLICATION

This application claims priority to U.S. Provisional Patent Application No. 63/106,973, filed Oct. 29, 2020, for "Parking Spot Route Optimization Systems And Methods For Optimizing Parking Spot Databases," which is hereby incorporated by reference in its entirety including the drawings.

TECHNICAL FIELD

The present specification generally relates to parking systems and methods for identifying an available parking spot in a parking area and navigating a vehicle to the available parking spot, and, more specifically, identifying a route to the available parking spot that optimizes the collection of availability data of other parking spots in the parking area while driving to the parking spot.

BACKGROUND

Vehicles may be equipped with navigation systems that provide navigation instructions to a particular destination and, in some instances, to a particular parking spot relative to the destination. As such, these navigation systems may provide turn-by-turn directions instructing the driver of the vehicle to the parking spot when within a parking area, such as a parking lot or parking structure. Further, these systems may select a route within the parking area directing the vehicle to the parking spot based on factors such as total driving distance or total driving time and, thus, selecting the particular route having a shortest driving distance or driving time. However, when selecting a route to the parking spot, these systems do not take into consideration an availability status of other parking spots provided along the route such that data may be collected of those other parking spots to optimize availability information of those parking spots for future navigation or parking requests of other vehicles.

Accordingly, a need exists for improved parking spot route optimization systems and methods that determine a preferred route to a parking spot that optimizes the collection of availability data of other parking spots within a parking area.

SUMMARY

In one embodiment, a method for optimizing a parking spot database includes determining a utility score of a candidate route to a candidate parking spot of a plurality of parking spots of a parking spot database based on an availability status of a non-candidate parking spot along the candidate route, and selecting the candidate route from a plurality of candidate routes based on the utility score.

In another embodiment, parking route optimization system includes a server including a parking spot database and a controller. The parking spot database includes a plurality of parking spots. Each of the plurality of parking spots of the parking spot database has an associated availability status indicating whether the parking spot is available. The controller is configured to determine a utility score of a candidate route to a candidate parking spot of the plurality of parking spots of the parking spot database based on an availability status of a non-candidate parking spot along the candidate route, and select the candidate route from a plurality of candidate routes based on the utility score.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are directed to parking spot optimization systems and methods for collecting availability data of parking spots within a parking area by a vehicle, and navigating a vehicle to an available parking spot along a route to optimize the collection of availability data. The parking spot optimization methods generally include identifying one or more candidate routes, assigning a utility score to the one or more candidate routes; identifying one or more non-candidate parking spots along the one or more candidate routes; adjusting the utility score of the one or more candidate routes based on an availability status of the one or more non-candidate parking spots along the one or more candidate routes; and selecting a preferred route of the one or more candidate routes based on the utility score of the one or more candidate routes.

Various embodiments of the parking spot optimization route systems and operation of the parking spot optimization route systems are described in more detail herein. Whenever possible, the same reference numerals will be used throughout the drawings to refer to the same or like parts.

Figure 1:
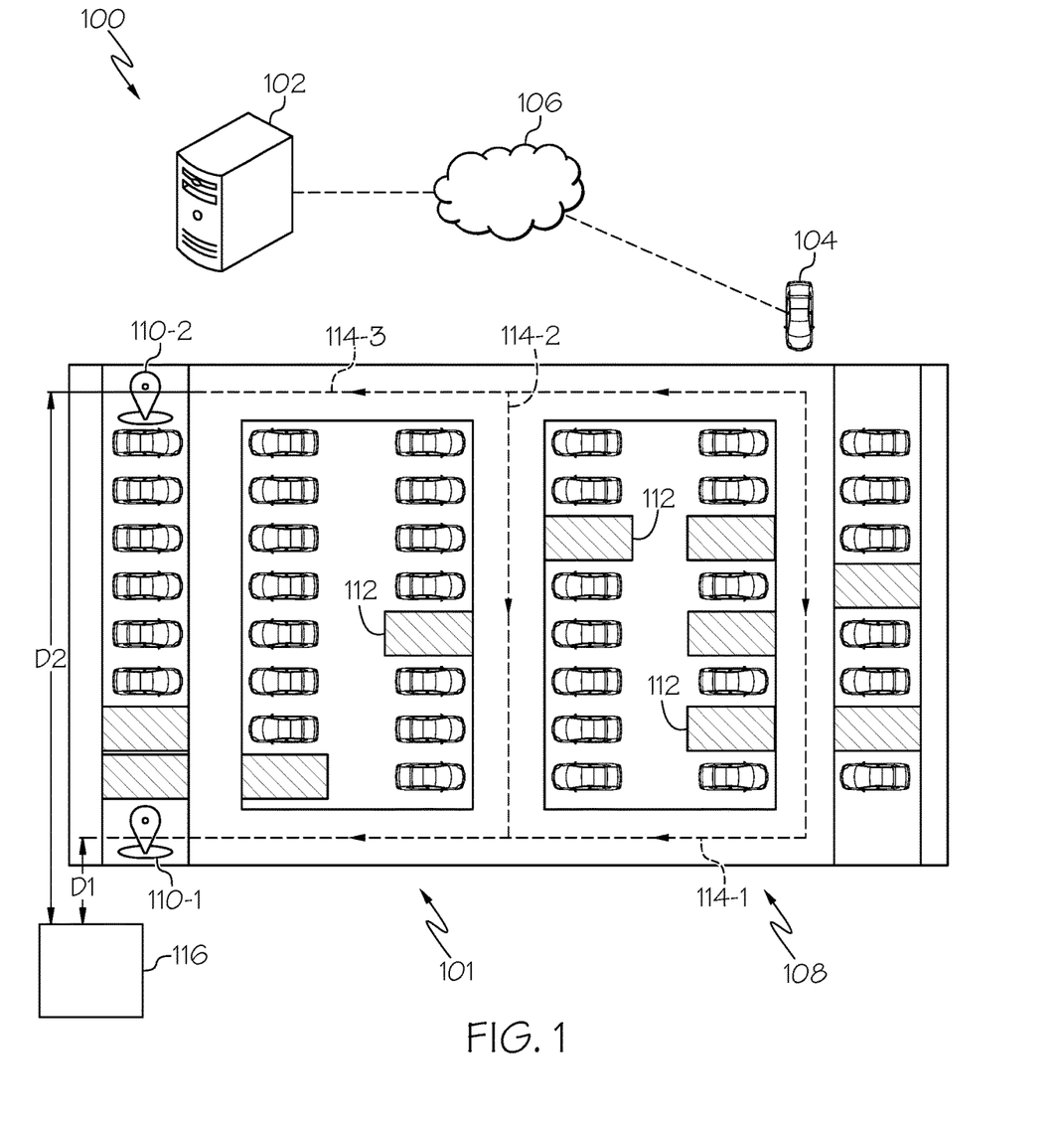
FIG. 1 schematically depicts a parking spot optimization system and a map according to one or more embodiments shown and described herein.

Referring now to FIG. 1, a parking route optimization system 100 is illustrated according to one or more embodiments described herein. The parking route optimization system 100 is shown generally including a server 102 configured to communicate with a vehicle 104 via a network 106.

The server 102 may be a remote server such as a cloud server. In some embodiments, the server 102 may be a local server including, but not limited to, a roadside unit, an edge server, and the like. The server 102 may communicate with the vehicle 104 in an area covered by the server 102. The server 102 may communicate with other servers that cover different areas. The server 102 may communicate with a remote server and transmit information collected by the server 102 to the remote server. The vehicle 104 may be an automobile or any other passenger or non-passenger vehicle such as, for example, a terrestrial, aquatic, and/or airborne vehicle including, but not limited, a bus, a scooter, a drone, and a bicycle. In some embodiments, the vehicle 104 may be an autonomous vehicle that navigates its environment with limited human input or without human input.

The vehicle 104 is shown at a starting location of a parking area 108 including a plurality of parking spots including a plurality of candidate parking spots 110-1, 110-2, generally referred to herein as candidate parking spot 110, and non-candidate parking spots 112. The parking area 108 may be depicted as a map 101 stored in the server 102 to illustrate an availability status of the parking spots within the map 101. In embodiments, the parking area 108 may be a parking lot, a parking structure including multiple levels, a plurality of streets including parking spots on the side of the street, and the like. As shown, a plurality of candidate routes 114-1, 114-2, 114-3, generally referred to herein as candidate route 114, are illustrated in the parking area 108 as dashed lines directing the vehicle 104 to one or more candidate parking spots 110. As such, three different candidate routes 114-1, 114-2, 114-3 are illustrated indicating different routes from the vehicle 104 to two different candidate parking spots 110-1, 110-2. Although only two candidate parking spots 110 are illustrated, it should be appreciated that, in some embodiments, only one candidate parking spot 110 may be identified, and in other embodiments, more than two candidate parking spots 110 may be identified by the server 102. Thus, a plurality of candidate routes 114 for each of the candidate parking spots 110 may be identified for directing the 104 to each of the candidate parking spots 110. As shown, a distance D1 is illustrated between a target destination 116 and a first candidate parking spot 110-1 and a distance D2 is illustrated between the target destination 116 and a second candidate parking spot 110-2.

As shown, a plurality of non-candidate parking spots 112 are provided along each of the candidate routes 114. As used herein, the non-candidate parking spots 112 refer to any parking spot other than the candidate parking spots 110. Thus, a plurality of non-candidate parking spots 112 may be provided along each candidate route 114. As described in more detail herein, the server 102 includes a parking spot database in which the parking spots, both candidate parking spots 110 and non-candidate parking spots 112, are assigned an availability status. In some embodiments, the availability status may be assigned a classification such as "available," i.e., no vehicle is parked within the parking spot, "occupied," i.e., a vehicle is parked within the parking spot, or "unknown," in which no knowledge is known about the parking spot. As shown, non-candidate parking spots 112 having an availability status that is "unknown" are illustrated with shading. Non-candidate parking spots 112 depicting a vehicle parked therein have an availability status that is "occupied." Although not shown in FIG. 1, non-candidate parking spots 112 depicting no vehicle parked therein have an availability status of "available."

The availability status of each parking spot may be determined by receiving availability data of each parking spot from vehicles passing the parking spot. In response to the server 102 receiving the availability data of each parking spot, the server 102 updates the parking spot database to indicate the classification assigned to the availability status of each parking spot as being either "available," or "occupied." However, when a period of time since a previous update to the availability status of a corresponding parking spot exceeds a threshold time limit, the availability status associated with the parking spot may be updated such that the availability status of the parking spot is "unknown." For example, a parking spot previously having an availability status indicating the parking spot as being "occupied" may no longer be occupied after a threshold time limit, and a parking spot previously having an availability status indicating the parking spot as being "available" may no longer be available after a threshold time limit. In this instance, the availability status of the parking spot may be changed to "unknown" after the threshold time limit until the availability status of the parking spot is updated by a vehicle.

In some embodiments, as described in more detail herein, the availability status may be assigned a probability ranging between a lower limit, such as 0.0, to an upper limit, such as 1.0. The probability may indicate a likelihood that the parking spot has an availability status as either "occupied" when the probability is closer to one of the lower limit or the upper limit and "available" when the probability is closer to the other of the lower limit and the upper limit, as opposed to a discrete classification. Similar to the manner discussed above with respect to the availability status changing to "unknown" when a period of time since the last update exceeds a threshold time limit, the probability may gradually move toward a baseline between the lower limit and the upper limit as time passes since the last update. In some embodiments, the baseline is a probability halfway between the lower limit and the upper limit, such as 0.5, indicating that no knowledge of the parking spot is available. A probability of 0.5 in this instance equates to an availability status assigned a classification of "unknown." However, in some embodiments, the baseline may be closer to one of the lower limit or the upper limit based on obtained historical data that the parking spot is more likely to be either available or occupied as a period of time passes since the last update. In embodiments, the probability may be adjusted to the baseline once a period of time since the last update exceeds a threshold time limit or, in some embodiments, the probability may be gradually adjusted toward the baseline as the time passes since the last update.

As described in more detail herein, the server 102 selects a preferred route to a preferred parking spot from the plurality of candidate routes 114 and the plurality of candidate parking spots 110 based on a utility score associated with each candidate route 114. When the availability status of the non-candidate parking spots 112 are assigned a classification, the utility score is determined by the server 102 based on a total number of non-candidate parking spots 112 having an availability status as "unknown" along each of the candidate routes 114. However, in embodiments in which the availability status is assigned a probability rather than the discrete classification, the utility score may be adjusted based on an entropy value of each parking spot. In this embodiment, parking spots having a probability closer to a baseline halfway between the lower limit and the upper limit, such as 0.5, indicating no knowledge favoring the parking spot being either available or occupied, will receive a greater entropy value than those parking spots having a probability closer to the lower limit or the upper limit. The entropy value is then utilized to adjust the utility score such that parking spots having higher entropy value, i.e., a probability closer to half way between the lower limit and the upper limit, will increase the utility score more than those parking spots having a lower entropy value, i.e., probability closer to the lower limit or the upper limit.

Thus, the vehicle 104 traveling along any one of the candidate routes 114 may be utilized to collect availability data of the non-candidate parking spots 112 in the manner described herein and transmit this availability data to the server 102 such that the availability status of the non-candidate parking spots 112 may be updated for future vehicle parking requests.

Figure 2:
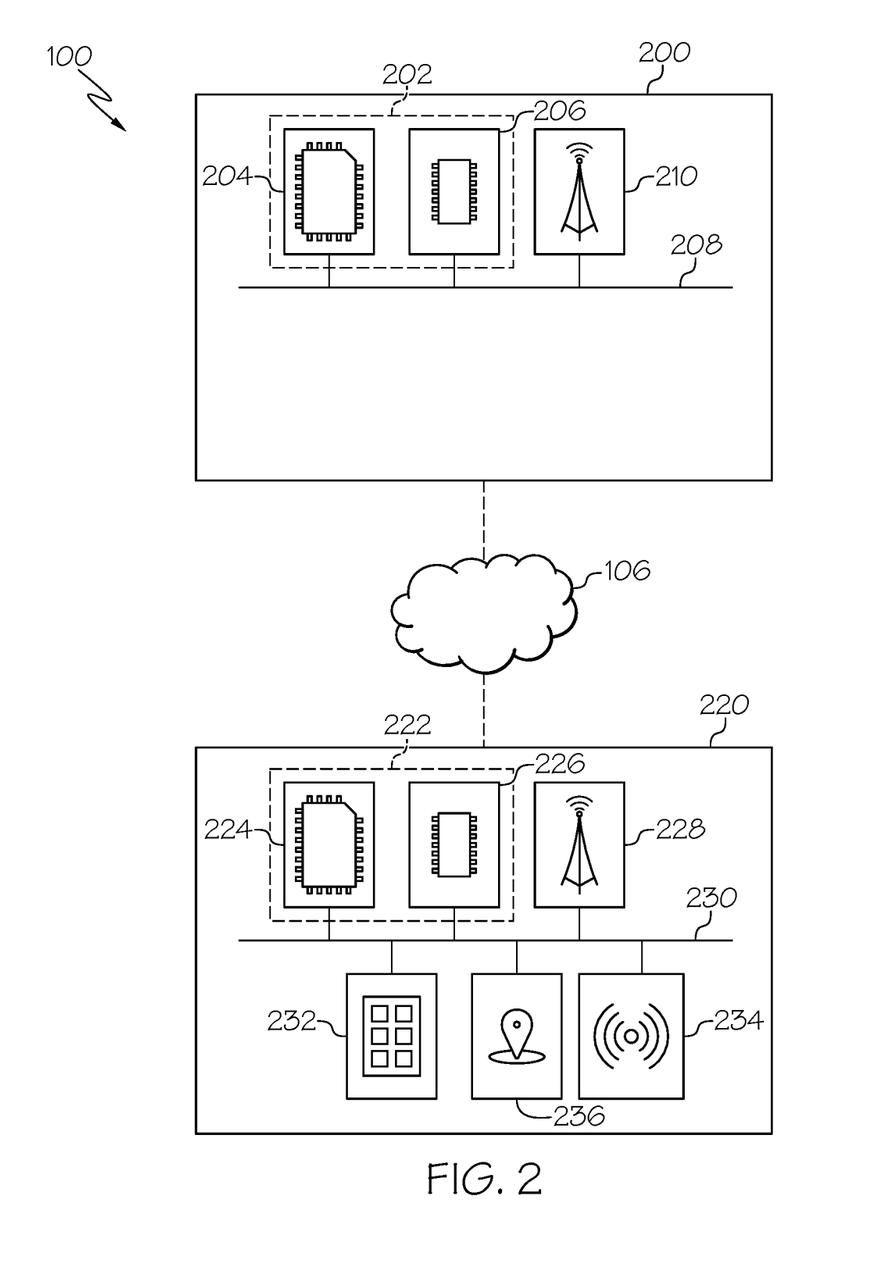
FIG. 2 schematically depicts a server system of the parking spot optimization system communicating with a vehicle system according to one or more embodiments shown and described herein.

FIG. 2 depicts a schematic diagram of the parking route optimization system 100 including a server system 200 configured to communicate with a vehicle system 220, according to one or more embodiments shown and described herein. It is noted that, while the server system 200 and the vehicle system 220 are depicted in isolation, each of the server system 200 and the vehicle system 220 may be included within the server 102 and the vehicle 104 of FIG. 1, respectively.

The server system 200 includes a controller 202 including one or more processors 204 and one or more memory modules 206. Each of the one or more processors 204 may be any device capable of executing machine readable and executable instructions. Accordingly, each of the one or more processors 204 may be a controller, an integrated circuit, a microchip, a computer, or any other computing device. The one or more processors 204 are coupled to a communication path 208 that provides signal interconnectivity between various modules of the server system 200. Accordingly, the communication path 208 may communicatively couple any number of processors 204 with one another, and allow the modules coupled to the communication path 208 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 208 may be formed from any medium that is capable of transmitting a signal such as, for example, conductive wires, conductive traces, optical waveguides, or the like. In some embodiments, the communication path 208 may facilitate the transmission of wireless signals, such as WiFi, Bluetooth®, Near Field Communication (NFC) and the like. Moreover, the communication path 208 may be formed from a combination of mediums capable of transmitting signals. In one embodiment, the communication path 208 comprises a combination of conductive traces, conductive wires, connectors, and buses that cooperate to permit the transmission of electrical data signals to components such as processors, memories, sensors, input devices, output devices, and communication devices. Accordingly, the communication path 208 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

As noted above, the server system 200 includes one or more memory modules 206 coupled to the communication path 208. The one or more memory modules 206 may comprise RAM, ROM, flash memories, hard drives, or any device capable of storing machine readable and executable instructions such that the machine readable and executable instructions can be accessed by the one or more processors 204. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Still referring to FIG. 2, the server system 200 includes network interface hardware 210 for communicatively coupling the server system 200 to the vehicle system 220. The network interface hardware 210 can be communicatively coupled to the communication path 208 and can be any device capable of receiving and transmitting data via the network 106. Accordingly, the network interface hardware 210 can include a communication transceiver for sending and/or receiving any wired or wireless communication. For example, the network interface hardware 210 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 210 includes hardware configured to operate in accordance with the Bluetooth® wireless communication protocol. For example, the network interface hardware 210 of the server system 200 may receive availability data from the vehicle system 220 for updating the availability status of the parking spots in the parking spot database of the server system 200. In addition, the server system 200 may receive a navigation request from the vehicle system 220 indicating a request to navigate the vehicle 104 to a target destination. In response to the server system 200 receiving the request, the server system 200 may transmit navigation instructions to the vehicle system 220 as described herein.

Still referring to FIG. 2, the server system 200 may be communicatively coupled to the vehicle system 220 by the network 108. In one embodiment, the network 108 may include one or more computer networks (e.g., a personal area network, a local area network, or a wide area network), cellular networks, satellite networks and/or a global positioning system and combinations thereof. Accordingly, the server system 200 can be communicatively coupled to the network 108 via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

Still referring to FIG. 2, the vehicle system 220 includes a controller 222 including one or more processors 224 and one or more memory modules 226, network interface hardware 228, and a communication path 230 communicatively connected to the other components of the vehicle system 220. The components of the vehicle system 220 may be structurally similar to and have similar functions as the corresponding components of the server system 200 (e.g., the one or more processors 224 corresponds to the one or more processors 204, the one or more memory modules 226 corresponds to the one or more memory modules 206, the network interface hardware 228 corresponds to the network interface hardware 210, and the communication path 230 corresponds to the communication path 208).

The vehicle system 220 also includes a user interface 232 communicatively coupled to the other components of the vehicle system 220 via the communication path 230. The user interface 232 includes one or more controls for inputting and/or selecting a target destination. The target destination may be selected by operating the one or more controls to enter a name or address of the target destination. The one or more controls may be any suitable user operating controls such as, for example, buttons or tactile input on a touch-screen device. The user interface 232 of the vehicle system 220 may include a display for displaying navigation instructions received from the server system 200 for directing the vehicle 104 to the target destination. The navigation instructions may include turn-by-turn directions toward a preferred parking spot determined by the server system 200. As described in more detail herein, the preferred route receives a utility score based on a number of factors including, for example, a driver parking location preference, a distance between the one or more candidate parking spots 110 and a target destination 116, a distance between the one or more candidate parking spots 110 and a current location of the vehicle 104, a parking fee, a dimension of the vehicle 104, and a turning radius of the vehicle 104. Thus, a user of the vehicle 104 may input preferences for each of the factors by operating the controls of the user interface 232. For example, the user of the vehicle 104 may select a preference to park in a corner of the parking area 108 or not between two already parked vehicles to avoid being close to other vehicles. In addition, the user may select parking only in parking spots that do not require a parking fee. The user may also select a preference to prioritize parking routes that minimize the number of turns required while navigating to the parking spot. As described herein, each of these preferences selected by the user are utilized to determine the initial utility score for any candidate route 114.

Referring still to FIG. 2, the vehicle system 220 may include one or more imaging devices 234 such as, for example, a camera. In some embodiments, the one or more imaging devices 234 may include one or more optical components, such as a mirror, fish-eye lens, or any other type of lens. In some embodiments, the one or more imaging devices 234 include one or more imaging sensors configured to operate in the visual and/or infrared spectrum to sense visual and/or infrared light. Additionally, while the particular embodiments described herein are described with respect to hardware for sensing light in the visual and/or infrared spectrum, it is to be understood that other types of sensors are contemplated. For example, the sensors described herein could include one or more LIDAR sensors, radar sensors, sonar sensors, or other types of sensors and that such data could be integrated into or supplement the data collection described herein. The one or more imaging devices 234 of the vehicle system 220 capture availability data of the non-candidate parking spots 112 passed by the vehicle 104 as the vehicle 104 drives along the preferred route toward the preferred parking spot.

The vehicle system 220 includes a location sensor 236 communicatively coupled to the other components of the vehicle system 220 via the communication path 230. The location sensor 236 may be, for example, a GPS module, configured to capture location data indicating a location of the vehicle 104, which may be transmitted to the server system 200. The location data is utilized to correlate captured availability data of a non-candidate parking with an associated parking spot in the parking spot database of the server system 200 having a known location.

Figure 3:
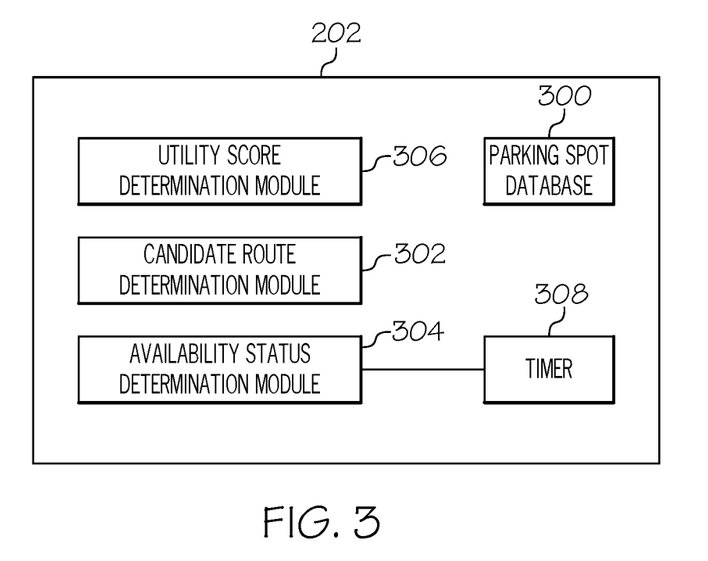
FIG. 3 schematically depicts a controller of the server system according to one or more embodiments shown and described herein.

Referring now to FIG. 3, the controller 202 of the server system 200 is shown with reference to the parking area 108 in FIG. 1. The controller 202 generally includes a parking spot database 300, a candidate route determination module 302, an availability status determination module 304, and a utility score determination module 306. The parking spot database 300 includes, in some embodiments, maps of parking areas identifying parking spots within each of the parking areas. Each of the parking spots have an assigned location within the parking area 108, for example, geographic coordinates, such that availability data received from a vehicle may be assigned to the correct parking spot based on a detected location of the vehicle 104 when the availability data was captured. Each parking spot in the parking spot database 300 receives an availability status, which may be updated by the availability status determination module 304. As discussed herein, the availability status may be assigned a classification, "occupied," "available," or "unknown" or, alternatively, a probability ranging between a lower limit and an upper limit.

In response to receiving a navigation request from the vehicle 104 indicating a target destination, the candidate route determination module 302 is configured to identify one or more candidate parking spots 110 having an availability status indicated as "available" or closer to one of the lower limit or the upper limit corresponding to a higher likelihood that the candidate parking spot 110 is available. As used herein, a probability closer to the upper limit is referred to as having a higher likelihood that the parking spot is available. However, in other embodiments, a probability closer to the lower limit may indicate a having a higher likelihood that the parking spot is available. The candidate route determination module 302 is then configured to identify one or more candidate routes 114 to each of the candidate parking spots 110.

The utility score determination module 306 is configured to assign a utility score to each of the candidate routes 114. The utility score is initially determined based on a number of factors unrelated to non-candidate parking spots 112 along the candidate routes 114. Such factors may include, for example, a driver parking location preference, a distance between the one or more candidate parking spots 110 and the target destination 116, a distance between the one or more candidate parking spots 110 and a current location of the vehicle 104, a parking fee, a dimension of the vehicle 104, and a turning radius of the vehicle 104. The utility score determination module 306 is communicatively coupled to the parking spot database 300 to identify non-candidate parking spots 112 along each of the candidate routes 114 and adjust the initial utility score of each candidate route 114 accordingly.

In embodiments in which the availability status of the one or more parking spots are assigned a classification, the utility score determination module 306 adjusts the utility score of each candidate route 114 based on the number of non-candidate parking spots 112 located along each candidate route 114 having an "unknown" availability status. Thus, it should be appreciated that, in this embodiment, the utility score is based on a binary determination of on how many non-candidate parking spots 112 along the candidate route 114 has an "unknown" availability status. In embodiments in which the availability status of the one or more parking spots are assigned a probability, the utility score determination module 306 adjusts the utility score for each candidate route 114 based on the entropy value of each parking spot. As discussed herein, a probability half way between the lower limit and the upper limit has the highest entropy value, which results in the greatest increase of the utility score as opposed to a probability closer to the lower limit or the upper limit having a lower entropy value.

In either embodiment, the candidate routes 114 are then ranked to give priority to the candidate route 114 having the highest utility score and the highest ranking candidate score is identified as the preferred route. While it should be appreciated that the preferred route may not necessarily include the greatest number of non-candidate parking spots 112 having an "unknown" availability status or the highest entropy values, due to the factors determining the utility score initially, the likelihood that the preferred route has a greater number of non-candidate parking spots 112 having an "unknown" availability status or higher entropy values is increased.

The availability status determination module 304 is configured to continually update the availability status, e.g., the classification or the probability, of the parking spots in the parking spot database 300. In embodiments, the availability status of a parking spot is updated in response to receiving availability data from a vehicle passing the corresponding non-candidate parking spot 112. For example, a parking spot having an availability status indicated as being "available" will be changed to "occupied" in response to receiving availability data from a vehicle 104 indicating that the corresponding non-candidate parking spot 112 is occupied by a vehicle. Alternatively, a parking spot having an availability status indicated as "occupied" will be changed to "available" in response to receiving availability data from a vehicle indicating that the corresponding non-candidate parking spot 112 is not occupied by a vehicle. In embodiments in which the availability status is assigned a probability, it should be appreciated that the probability of any parking spot may not be exactly equal to the lower limit (0.0) or the upper limit (1.0) immediately after receiving availability data from the vehicle due to noise, i.e., interference, and the inability to be certain of the availability of the parking spot. The availability status determination module 304 is communicatively coupled to the parking spot database 300 such that the availability status of each of the parking spots may be updated in the parking spot database 300 for purposes of selecting future candidate parking spots that are not occupied.

In some embodiments, the availability status determination module 304 includes a timer 308 configured to determine how much time has passed since the availability status of each parking spot has been updated. Each parking spot may be assigned an associated threshold time limit. The threshold time limit may be the same for each parking spot or it may be different for each parking spot based on a location of the parking spot within the parking area 108, i.e., high traffic area versus low traffic area. The threshold time limit may be based on historical data indicating an average time in which a parked vehicle leaves the particular parking spot or a vehicle parks in the particular parking spot. When the availability status of a parking spot has not been updated for a period of time exceeding the threshold time limit, the availability status of the parking spot may be changed to "unknown" and updated in the parking spot database 300, in embodiments in which the availability status is assigned a classification. By changing the availability status of the parking spot to "unknown" when the period of time since the last availability status update exceeds the threshold time limit, the utility score of that particular candidate route 114 may be increased. In embodiments in which the availability status is assigned a probability, the availability status determination module 304 may gradually adjust the probability toward the baseline as the period of time since the last update to the availability status of the parking spot increases. As discussed herein, the baseline may be a probability half way between the lower limit and the upper limit indicating no knowledge of the availability status, or some other probability based on historical data of the particular parking spot indicating that the parking spot is more likely to be available or occupied as a period of time since the last update increases.

In some embodiments, when prioritizing the candidate routes 114, the availability status determination module 304 will take into account a parking spot having an availability status that will be updated within a predetermined time based on another vehicle already assigned a candidate route including that parking spot. This reduces the likelihood of assigning two vehicles a route at a similar time to collect availability data of the same parking spot. More particularly, when a first vehicle is assigned a route including a parking spot, the classification or probability of that parking spot may be disregarded when prioritizing candidate routes for a second vehicle as the availability status of the parking spot will be updated prior to the second vehicle passing the parking spot or within a predetermined time. In some embodiments, the classification of the parking spot may be assigned some indicator such as, for example, "to be assigned soon" such that the utility score determination module 300 does not take into consideration the utility score of the parking spot when prioritizing the routes.

Figure 4:
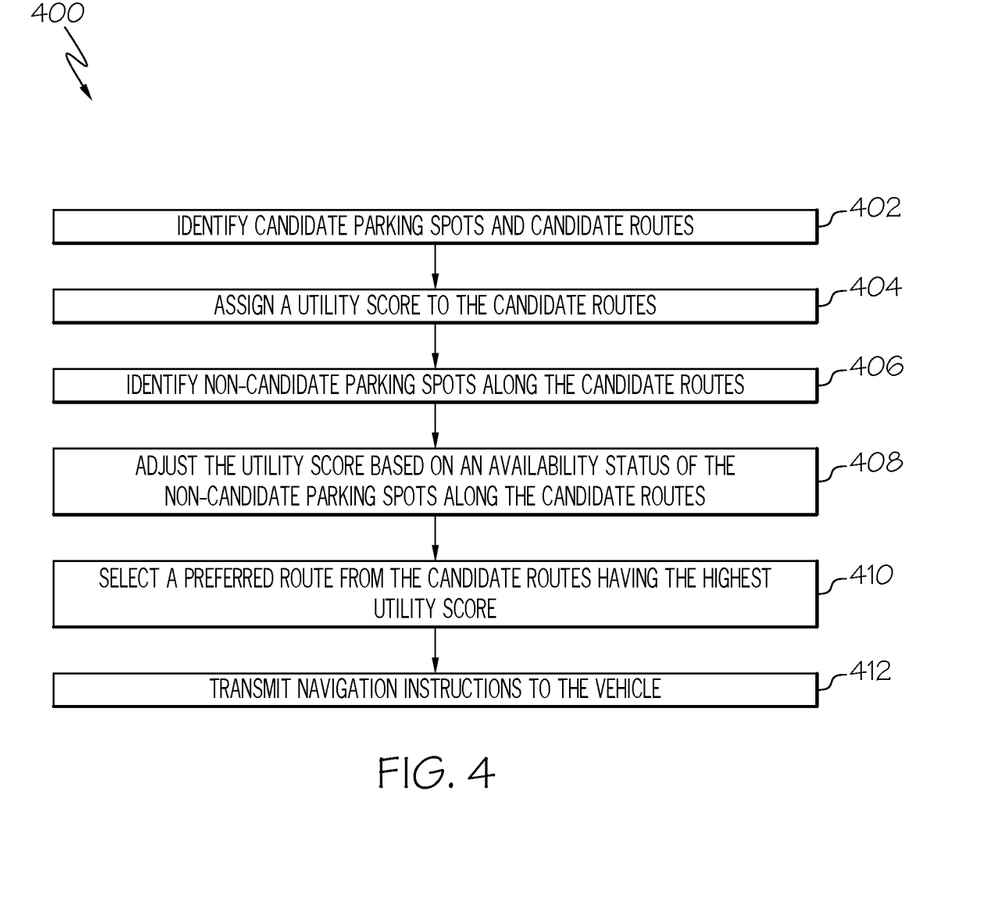
FIG. 4 schematically depicts a flowchart of a method for determining a preferred route according to one or more embodiments shown and described herein.

FIG. 4 depicts a method 400 for determining a preferred route from the plurality of candidate routes 114 and transmitting navigation instruction to the vehicle 104 to arrive at a preferred parking spot of the candidate parking spots 110, according to one or more embodiments shown and described herein. The method 400 is described herein with reference to FIGS. 1-3.

Initially, at step 402, the server 102 receives a navigation request from the vehicle 104 including identifying information of the target destination 116 and a location of the vehicle 104. In response, the server 102 identifies one or more candidate parking spots 110 from the parking spot database 300 and one or more candidate routes 114 from the vehicle 104 to the one or more candidate parking spots 110. In selecting the one or more candidate parking spots 110, the candidate parking spots 110 are only selected among those parking spots in the parking spot database 300 having an availability status indicating "available" or a probability close to the upper limit indicating a high likelihood that the parking spot is available.

At step 404, the utility score determination module 306 assigns a utility score to each of the candidate routes 114 based on a number of factors. As described herein, the factors may be based on the candidate parking spot 110 such as, for example, a driver parking location preference, a distance between the one or more candidate parking spots 110 and the target destination 116, a distance between the one or more candidate parking spots 110 and a current location of the vehicle 104, a parking fee, a dimension of the vehicle 104, and a turning radius of the vehicle 104. This information is utilized to initially provide the utility score for each candidate route 114. As a non-limiting example, the utility score for a candidate route 114 to a candidate parking spot 110 that is at located at a user preferred location, i.e., away from other vehicles, may be greater than another candidate route 114 to a candidate parking spot 110 that is farther from the target destination 116. As another non-limiting example, the utility score for a candidate route 114 to a candidate parking spot 110 that is closer to the target destination 116 may be greater than another candidate route 114 to a candidate parking spot 110 that is farther from the target destination 116. As another non-limiting example, the utility score for a candidate route 114 to a candidate parking spot 110 that does not include a parking fee may be greater than another candidate route 114 to a candidate parking spot 110 that includes a parking fee.

At step 406, the server 102 identifies non-candidate parking spots 112 along each of the candidate routes 114. In some embodiments, the non-candidate parking spots 112 may be identified as those parking spots having an availability status indicating "unknown." In other embodiments, non-candidate parking spots 112 may be identified as any parking spot having an assigned probability such that the probability of each of the non-candidate parking spots 112 may be utilized to adjust the utility score of the candidate routes 114.

At step 408, the utility score of each candidate route 114 is adjusted to rank the candidate routes 114. In embodiments in which the non-candidate parking spots 112 are assigned the "unknown" classification, the utility score may be adjusted for each candidate route 114 based on the number of non-candidate parking spots 112 provided along the candidate route 114. Thus, in this embodiment, it is a binary determination of how many non-candidate parking spots 112 are located along the candidate routes 114 and the utility score of each of the candidate routes 114 is adjusted accordingly. In other embodiments in which the non-candidate parking spots 112 are assigned a probability factor, each of the probabilities are converted to an entropy value and utilized to adjust the utility score for each candidate route 114. Thus, for example, a probability of a non-candidate parking spot 112 that is closer to half way between the lower limit and the upper limit, i.e., least likely to have an availability status of "available" or "occupied," will have a greater entropy value and, thus, increase the utility score of the candidate route 114 more than a non-candidate parking spot 112 that has a probability closer to the lower limit or the upper limit, i.e., more likely to have an availability status of "available" or "occupied", respectively, which has a lower entropy value.

At step 410, the candidate route 114 having the highest utility score among the other candidate routes 114 is selected as the preferred route. At step 412, the server 102 transmits navigation instructions to the vehicle 104. In embodiments, the navigation instructions may be displayed on the user interface 232 of the vehicle 104 to navigate the user of the vehicle 104 to the preferred parking spot along the preferred route. In some embodiments, the user may be able to decline the preferred route selected by the server 102. In this instance, the server 102 may receive a signal from the vehicle 104 to select a new preferred route from the candidate routes 114. As such, the server 102 may select the next candidate route 114 in the ranking as the preferred route and send updated navigation instructions to the vehicle 104 with respect to the new preferred route to navigate the vehicle 104 to the preferred parking spot along the preferred route.

Figure 5:
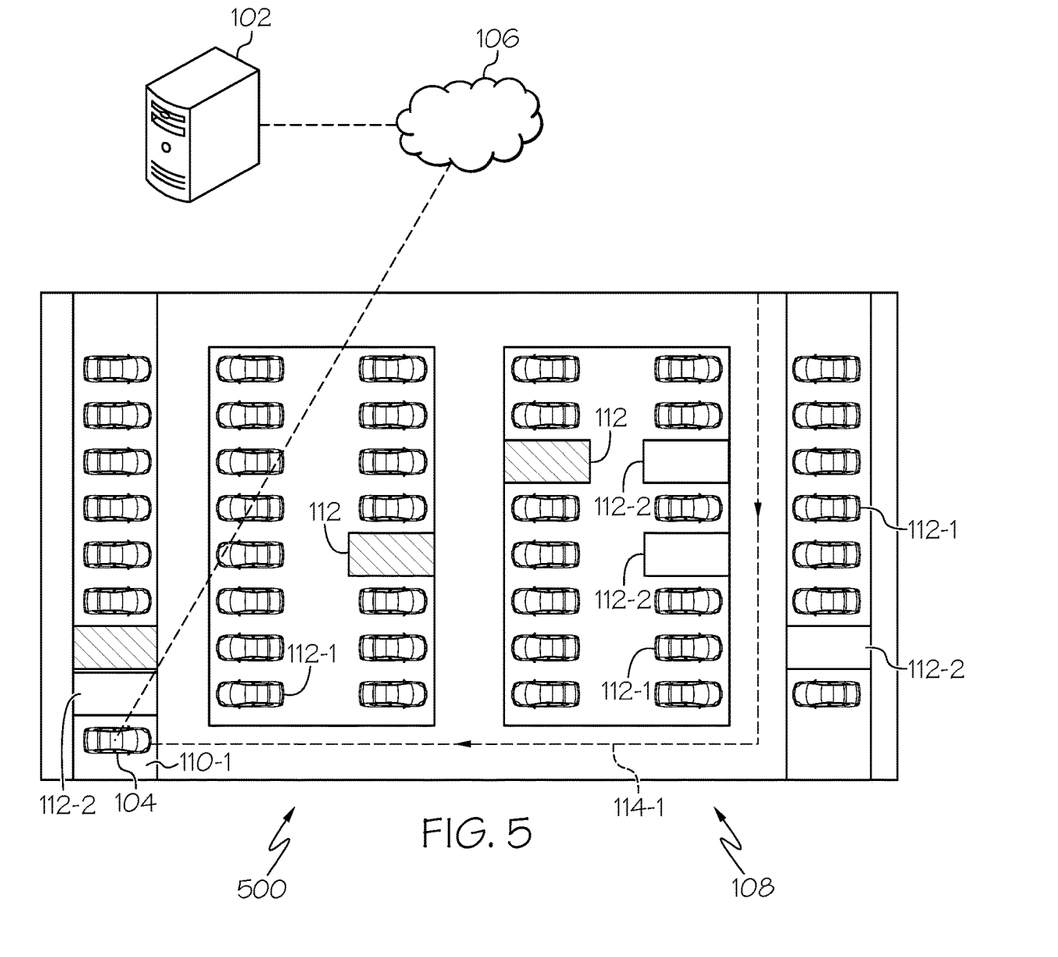
FIG. 5 schematically depicts the parking spot optimization system and an updated map after the parking spot optimization system has collected availability data from a vehicle according to one or more embodiments shown and described herein.

FIG. 5 illustrates an updated map 500 of the parking area 108 after the vehicle 104 has driven along the preferred route to the preferred parking spot and collected availability data of each non-candidate parking spot 112 along the candidate route 114 such that the parking spot database 300 has been updated. As shown, the vehicle 104 is parked in the preferred parking spot, the non-candidate parking spots 112-1 are now illustrated as being occupied by vehicles and the non-candidate parking spots 112-2 are illustrated as being available without a parked vehicle. Although not shown, it should be appreciated that other non-candidate parking spots 112 may remain illustrated as shaded to indicate an availability status of the non-candidate parking spot 112 remains "unknown," such as those non-candidate parking spots 112 that were not located along the preferred route 114-1. This may be due to inaccuracy of sensor data processing algorithms or noise included in the sensor data received by the imaging device 234 of the vehicle 104 when passing the particular non-candidate parking spot 112.

Figure 6:
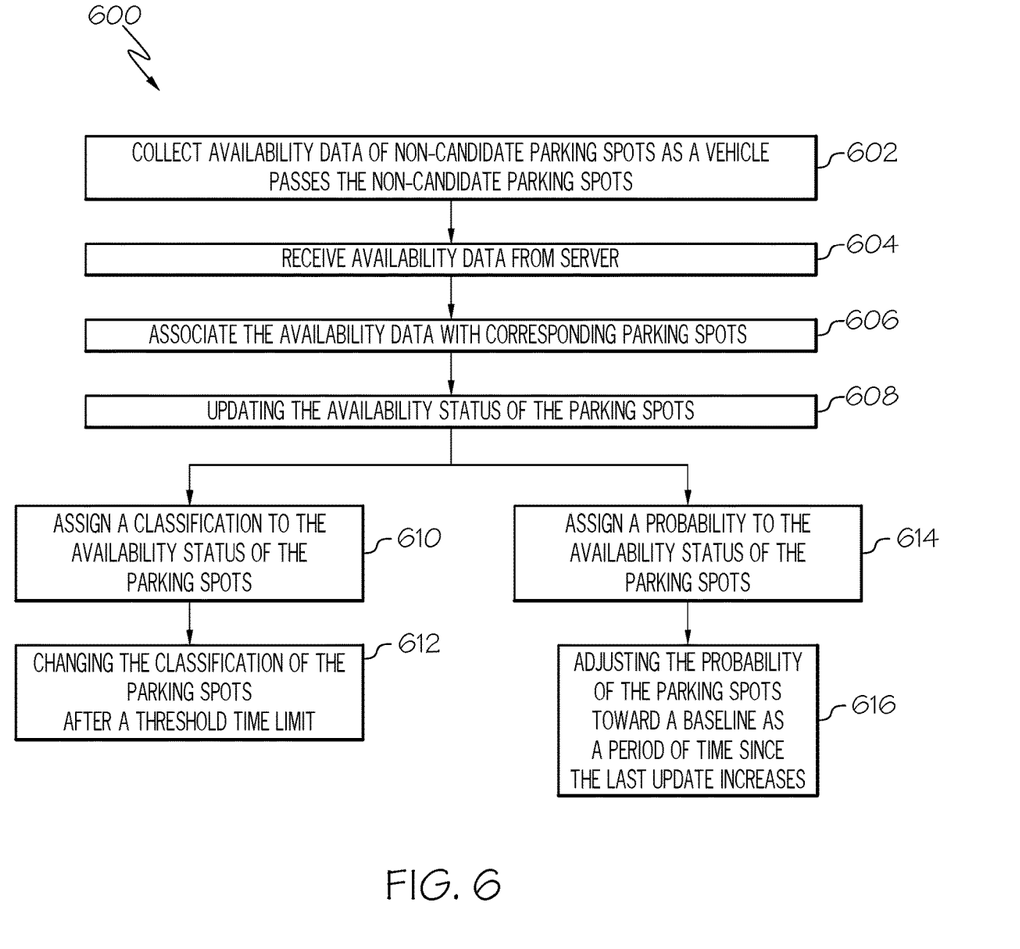
FIG. 6 schematically depicts a flowchart of a method for updating an availability status of parking spots within a parking area according to one or more embodiments shown and described herein.

FIG. 6 depicts a method 600 for updating the parking spot database 300 to reflect the availability of each parking spot in the parking spot database 300 in response to receiving availability data from the vehicle 104 passing the non-candidate parking spots 112. As such, the method 600 occurs after the preferred route is determined and the vehicle 104 is either driving toward the preferred parking spot or already at the preferred parking spot. The method 600 is described herein with reference to FIGS. 1-3 and 5.

At step 602, the vehicle 104 captures availability data of the non-candidate parking spots 112 as it drives past each non-candidate parking spot 112. The availability data is captured using the one or more imaging devices 234 of the vehicle 104 including one or more sensors. Thus, the availability data may include image data obtained by hardware for sensing light in the visual and/or infrared spectrum. In particular, the image data identifies or detects whether a vehicle is present within each non-candidate parking spot 112. The vehicle 104 may be instructed by the server 102 to capture availability data of each parking spot within a viewing range of the one or more imaging devices 234 or, alternatively, the vehicle 104 may be instructed by the server 102 to capture availability data of only certain non-candidate parking spots 112, such as parking spots having an availability status that has not been updated in a period of time exceeding a predetermined threshold. By requiring availability data for only certain parking spots, such as specific non-candidate parking spots 112, the amount of data transmitted from the vehicle 104 to the server 102 is reduced. Further, the availability data may be transmitted in real-time, such as when the vehicle 104 passes each non-candidate parking spot 112 or, alternatively, the vehicle 104 may transmit all of the availability data as a single transmission when the vehicle 104 arrives at the preferred parking spot to reduce the number of transmissions from the vehicle 104 to the server 102. When transmitting the availability data, location data indicating a location of the vehicle 104 when the availability data for each non-candidate parking spot 112 was captured is also transmitted to the server 102.

At step 604, the server 102 receives the availability data, including image data of each non-candidate parking spot 112 and location data of the vehicle 104, from the vehicle 104.

At step 606, the availability data captured of a non-candidate parking spot 112 is associated with a corresponding parking spot in the parking spot database 300 so that the availability status of the parking spots may be appropriately adjusted. As discussed herein, each parking spot within the parking spot database 300 is assigned a location, such as geographic coordinates or some other indication of a known location of the parking spot within the parking area 108. Thus, the captured availability data is associated with a corresponding parking spot in the parking spot database 300 based on the location of the vehicle 104 when the availability data was captured at the known location of the parking spots.

At step 608, once the availability data is associated with the corresponding parking spot, the availability status determination module 304 analyzes the availability data to determine whether the parking spot is occupied or available. The analysis may be performed utilizing image recognition software and/or machine learning algorithms to determine whether a vehicle is present within each parking spot. As described herein, the availability status may be assigned a classification, e.g., "occupied," "available," or "unknown," or a probability indicating a likelihood that the parking spot is either occupied or available.

At step 610, the available status of each parking spot is assigned a classification based on the availability data received from the vehicle 104 for those parking spots that availability data was captured. This updates the current availability status for those parking spots in the parking spot database 300 which the vehicle 104 passed while driving along the preferred route and for which availability data was accurately captured. Each time the availability status of a parking spot is updated, the timer 308 resets a running length of time since a previous update to the availability status of that particular parking spot. Thus, each parking spot has an associated running length of time since a previous update.

At step 612, the classification assigned to the availability status of a parking spot is changed to "occupied" when the running length of time since the previous update exceeds a threshold time limit. Accordingly, in instances in which the availability status of a parking spot is "occupied" or "available" for a period of time exceeding the threshold time limit, the availability status will be changed to "occupied" to indicate that a sufficient length of time has passed and the parking spot may no longer be available. This prevents the candidate route determination module 302 from selecting a candidate parking spot 110 that was previously indicated as "available," but may no longer be. The threshold time limit may be based on historical data collected for each parking spot or may be a default period of time.

At step 614, the availability status of each parking spot is assigned a probability rather than a classification. As discussed herein, the probability is between a lower limit and an upper limit. In this embodiment, the probability may be adjusted based on the availability data of a parking spot received from the vehicle 104 even when the availability data may be inconclusive to determine whether a vehicle was parked within the parking spot. As such, the probability of the parking spot may be adjusted to be closer to the lower limit if the availability status determination module 304 determines that the parking spot is likely to be occupied or closer to the upper limit if it is determined that the parking spot is likely to be available.

At step 616, as discussed herein, the probability of a parking spot may be adjusted, in some instances gradually or incrementally, toward a baseline between the lower limit and the upper limit as a period of time since the last update to the availability status is updated in response to availability data being received from a vehicle. This process is similar to that discussed in step 612 with respect to changing the classification, except for the fact that this allows for non-discrete changes rather than discrete/absolute changes in the availability status. For example, the probability may be adjusted toward a probability half way between the lower limit and the upper limit to indicate no knowledge of the availability of the parking spot. In other embodiments, as discussed herein, the baseline may be closer to one of the lower limit or the upper limit based on historical data indicating that the particular parking spot is more likely to be either occupied or available as time passes since the last update. In some embodiments, the baseline is dynamic such that the baseline changes for each parking spot based on a particular day or a time of day.

From the above, it is to be appreciated that defined herein is a parking spot optimization system and method for collecting availability data of parking spots within a parking area by a vehicle, and navigating a vehicle to an available parking spot along a route to optimize the collection of availability data.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
determining a utility score of a candidate route to a candidate parking spot of a plurality of parking spots of a parking spot database based on a number of non-candidate parking spots along the candidate route having an unknown availability status;
selecting the candidate route from a plurality of candidate routes based on the utility score; and
providing navigation instructions to a vehicle to navigate the vehicle along the preferred route to the preferred parking spot.

2. The method of claim 1, further comprising:
determining the utility score of each of the candidate routes of the plurality of candidate routes based on one or more factors; and
identifying the selected candidate route to the candidate parking spot as a preferred route to a preferred parking spot based on the utility score of each candidate route of the plurality of candidate routes.

3. The method of claim 2, further comprising:
receiving availability data of a non-candidate parking spot along the preferred route as a vehicle passes the non-candidate parking spot using a sensor of the vehicle.

4. The method of claim 3, further comprising:
associating the availability data with a corresponding one of the non-candidate parking spot based on a known location of the non-candidate parking spot and a location of the vehicle when the availability data is captured by the sensor.

5. The method of claim 3, further comprising:
updating the availability status of the non-candidate parking spot along the preferred route based on the availability data collected by the vehicle.

6. The method of claim 5, further comprising:
assigning a classification to the availability status of the non-candidate parking spot along the preferred route as either "available", "occupied", or "unknown".

7. The method of claim 6, further comprising:
changing the classification of the non-candidate parking spot along the preferred route to "unknown" in response to the availability status of the non-candidate parking spot not being updated for a period of time exceeding a threshold time limit.

8. The method of claim 5, further comprising:
assigning a probability to the availability status of the non-candidate parking spot along the preferred route, the probability being between a lower limit and an upper limit.

9. The method of claim 8, further comprising:
adjusting the probability toward a baseline between the lower limit and the upper limit as a period of time since the availability status of the non-candidate parking spot has been updated increases.

10. The method of claim 2, further comprising:
determining that the availability status of the non-candidate parking spot along the candidate route is to be updated by another vehicle within a predetermined time; and
in response determining that the availability status of the non-candidate parking spot along the candidate route is to be updated by another vehicle, disregarding the availability status of the non-candidate parking spot when updating the utility score of the candidate route.

11. The method of claim 2, wherein the one or more factors are selected from the group consisting of: a driver parking location preference, a distance between the candidate parking spot and a target destination, a distance between the candidate parking spot and a current location of a vehicle, a parking fee, a dimension of a vehicle, and a turning radius of a vehicle.

12. A parking route optimization system comprising:
a server comprising:
a parking spot database including a plurality of parking spots, each of the plurality of parking spots of the parking spot database having an associated availability status indicating whether the parking spot is available; and
a controller,
wherein the controller is configured to:
determine a utility score of a candidate route to a candidate parking spot of the plurality of parking spots of the parking spot database based on a number of non-candidate parking spots along the candidate route having an unknown availability status;
select the candidate route from a plurality of candidate routes based on the utility score;
provide navigation instructions to a vehicle to navigate the vehicle along the preferred route to the preferred parking spot.

13. The parking route optimization system of claim 12, wherein the controller is configured to:
determine the utility score of each of the candidate routes of the plurality of candidate routes based on one or more factors; and
identify the selected candidate route to the candidate parking spot as a preferred route to a preferred parking spot based on the utility score of each candidate route of the plurality of candidate routes.

14. The parking route optimization system of claim 13, wherein the controller is configured to:
receive availability data of a non-candidate parking spot along the preferred route as a vehicle passes the non-candidate parking spot using a sensor of the vehicle.

15. The parking route optimization system of claim 14, wherein the controller is configured to update the availability status of the non-candidate parking spot along the preferred route based on the availability data collected by the vehicle.

16. The parking route optimization system of claim 15, wherein the controller is configured to assign a classification to the availability status of the non-candidate parking spot along the preferred route as one of "available", "occupied", and "unknown".

17. The parking route optimization system of claim 16, wherein the controller is configured to change the classification of the non-candidate parking spot along the preferred route to "unknown" in response to the availability status of the non-candidate parking spot not being updated for a period of time exceeding a threshold time limit.

18. The parking route optimization system of claim 15, wherein the controller is configured to assign a probability to the non-candidate parking spot along the preferred route between a lower limit and an upper limit.

19. The parking route optimization system of claim 18, wherein controller is configured to adjust the probability toward a baseline between the lower limit and the upper limit in response to the availability status of the non-candidate parking spot not being updated for a period of time exceeding a threshold time limit.

* * * * *

UNITED STATES PATENT AND TRADEMARK OFFICE
CERTIFICATE OF CORRECTION

| | | |
|---|---|---|
| PATENT NO. | : 11,835,355 B2 | Page 1 of 1 |
| APPLICATION NO. | : 17/165197 | |
| DATED | : December 5, 2023 | |
| INVENTOR(S) | : Takamasa Higuchi and Kentaro Oguchi | |

It is certified that error appears in the above-identified patent and that said Letters Patent is hereby corrected as shown below:

In the Specification

In Column 10, Line(s) 4, after "vehicle", delete "parks" and insert --parked--, therefor.

Signed and Sealed this
Twenty-third Day of January, 2024

Katherine Kelly Vidal
*Director of the United States Patent and Trademark Office*